(12) United States Patent
Schur et al.

(10) Patent No.: US 12,043,290 B2
(45) Date of Patent: Jul. 23, 2024

(54) STATE IDENTIFICATION FOR ROAD ACTORS WITH UNCERTAIN MEASUREMENTS BASED ON COMPLIANT PRIORS

(71) Applicant: FORD GLOBAL TECHNOLOGIES, LLC, Dearborn, MI (US)

(72) Inventors: Randall Schur, Pittsburgh, PA (US); Alexander Metz, Munich (DE); Kevin Wyffels, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 17/835,824

(22) Filed: Jun. 8, 2022

(65) Prior Publication Data

US 2023/0399026 A1 Dec. 14, 2023

(51) Int. Cl.
*B60W 60/00* (2020.01)
*B60W 40/04* (2006.01)

(52) U.S. Cl.
CPC ........ *B60W 60/0027* (2020.02); *B60W 40/04* (2013.01); *B60W 2554/4041* (2020.02);
(Continued)

(58) Field of Classification Search
CPC ............ B60W 60/0027; B60W 40/04; B60W 2554/4041; B60W 2554/4042; B60W 2555/60; B60W 2556/40
(Continued)

(56) References Cited

U.S. PATENT DOCUMENTS 6,452,535 B1 * 9/2002 Rao .................. G01S 13/931
340/901
8,903,588 B2 12/2014 Schmüdderich et al.
(Continued)

FOREIGN PATENT DOCUMENTS

EP 3349146 A1 7/2018
EP 3396408 A1 10/2018
WO WO 2010/027795 A1 3/2020

OTHER PUBLICATIONS

Alharbi et al., "Context-Aware Sensor Uncertainty Estimation for Autonomous Vehicles," Vehicles, Oct. 25, 2021, 3, 721-735, https://doi.org/10.3390/vehicles3040042; 15 pages.
(Continued)

*Primary Examiner* — Muhammad Shafi
(74) *Attorney, Agent, or Firm* — Frank A. MacKenzie; Brooks Kushman P.C.

(57) ABSTRACT

Disclosed herein are system, method, and computer program product embodiments for state identification for road actors with uncertain measurements based on compliant priors. The perception system of an autonomous vehicle (AV) may detect an object with an uncertain kinematic state based on sensor information received from a sensing device associated with the AV. A first, second, and third distribution of velocity values may be generated based on the sensor information, map information, and a kinematic state for each additional object of a plurality of additional objects in proximity to the detected object with the uncertain kinematic state, respectively. A velocity value for the detected object with the uncertain kinematic state may be generated based on a comparison of the first, second, and third distributions of velocity values. The AV may perform a driving maneuver based on the velocity value for the detected object.

18 Claims, 6 Drawing Sheets

(52) U.S. Cl.
CPC . *B60W 2554/4042* (2020.02); *B60W 2555/60* (2020.02); *B60W 2556/40* (2020.02)

(58) Field of Classification Search
USPC .......................................................... 701/27
See application file for complete search history.

(56) References Cited

U.S. PATENT DOCUMENTS

| | | | |
|---|---|---|---|
| 8,948,995 B2 | 2/2015 | Pandita et al. | |
| 9,514,378 B2 | 12/2016 | Armstrong-Crews et al. | |
| 9,731,713 B2 | 8/2017 | Horii | |
| 10,054,678 B2 | 8/2018 | Mei et al. | |
| 10,220,766 B2 | 3/2019 | Soehner et al. | |
| 10,416,679 B2 | 9/2019 | Lipson et al. | |
| 10,445,599 B1 | 10/2019 | Hicks | |
| 10,545,505 B2 | 1/2020 | Sakai | |
| 10,936,922 B2* | 3/2021 | Tariq | G06F 18/2413 |
| 11,010,907 B1* | 5/2021 | Bagwell | G06V 20/56 |
| 11,209,822 B2* | 12/2021 | Gogna | G05D 1/0214 |
| 11,292,462 B1* | 4/2022 | Karasev | G06N 20/00 |
| 2004/0061598 A1* | 4/2004 | King | B60R 21/013 |
| | | | 340/435 |
| 2007/0279199 A1* | 12/2007 | Danz | G08G 1/166 |
| | | | 701/301 |
| 2017/0248693 A1 | 8/2017 | Kim | |
| 2018/0157269 A1 | 7/2018 | Prasad et al. | |
| 2018/0284779 A1 | 10/2018 | Nix | |
| 2018/0299534 A1 | 10/2018 | LaChapelle et al. | |
| 2019/0129009 A1 | 5/2019 | Eichenholz et al. | |
| 2020/0159244 A1 | 5/2020 | Chen et al. | |
| 2021/0103285 A1* | 4/2021 | Philbin | G01S 13/867 |
| 2021/0129834 A1* | 5/2021 | Gier | G05D 1/0088 |
| 2021/0133466 A1* | 5/2021 | Gier | G05D 1/0223 |
| 2021/0397880 A1* | 12/2021 | Deng | G01S 13/867 |

OTHER PUBLICATIONS

Dulian et al., "Physically constrained short-term vehicle trajectory forecasting with naive semantic maps," arXiv preprint, arXiv:2006.05159. Jun. 9, 2020; 11 pages.

Puphal et al., "Probabilistic Uncertainty-Aware Risk Spot Detector for Naturalistic Driving," IEEE Transactions on Intelligent Vehicles, vol. 4, No. 3, pp. 406-415, Sep. 2019, doi: 10.1109/TIV.2019.2919465; 10 pages.

* cited by examiner

STATE IDENTIFICATION FOR ROAD ACTORS WITH UNCERTAIN MEASUREMENTS BASED ON COMPLIANT PRIORS

BACKGROUND

Conventionally, with autonomous vehicle (AV) perception systems, tracking road actors and/or objects involves best estimates of state for all detected and segmented tracks (e.g., tracking information for objects and/or road actors, etc.). For an AV to operate in a dynamic environment, AV perception systems performing tracking operations must identify tracks as soon as possible. For an AV system, measuring the state (e.g., position, velocity, acceleration, etc.) of road actors and/or objects is inherently uncertain due to sensor properties, selected algorithms, sensor noise, sensor disagreements, obscured actors, object classes, etc. While the AV system is designed to handle some uncertainty, at times, the state (or part of the state) of road actors and/or objects is completely unknown, causing the AV system to make some assumptions. Thus, conventional AV perception systems are unable to accurately forecast tracks for road actors and/or objects with unknown states.

SUMMARY

A computer-based system, for example, a perception system of an automated vehicle (AV), may detect an object with an uncertain kinematic state. For example, based on sensor information received from a sensing device associated with the AV, the perception system may detect the object with the uncertain kinematic state. According to some aspects, the perception system may generate a first distribution of velocity values, for example, based on the sensor information. According to some aspects, the perception system may generate a second distribution of velocity values, for example, based on map information. According to some aspects, the perception system may generate a third distribution of velocity values, for example, based on a kinematic state for each additional object of a plurality of additional objects in proximity to the object with the uncertain kinematic state. According to some aspects, the perception system may generate a velocity value for the object with the uncertain kinematic state, for example, based on a comparison of the first distribution of velocity values, the second distribution of velocity values, and the third distribution of velocity values. According to some aspects, the AV may perform a driving maneuver based on the velocity value for the object.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
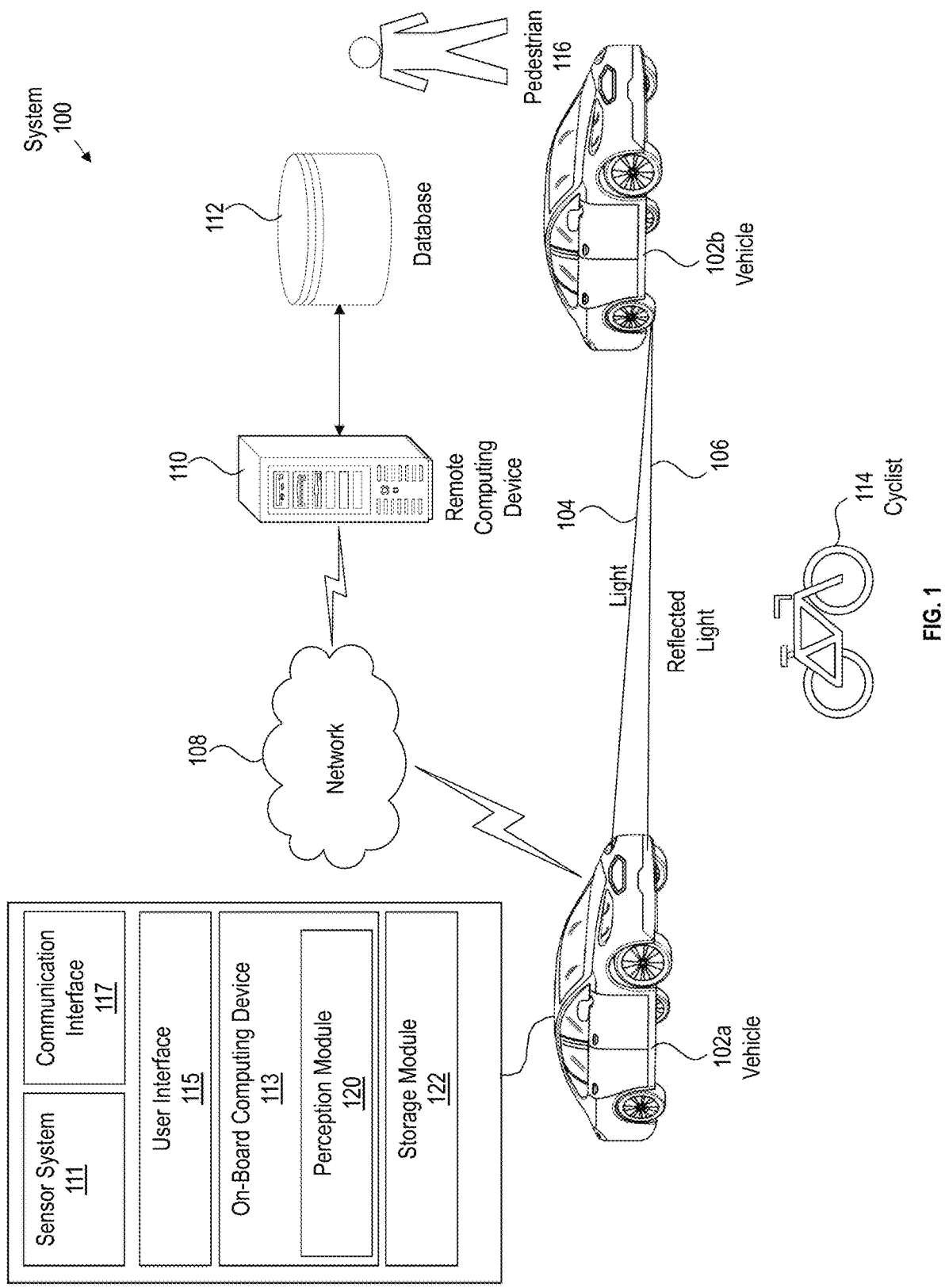
FIG. 1 shows an example autonomous vehicle system, in accordance with aspects of the disclosure.

Provided herein are system, apparatus, device, method, and/or computer program product embodiments, and/or combinations and sub-combinations thereof, for state identification for road actors with uncertain measurements based on compliant priors. According to some aspects, the perception system (e.g., computational system, inference system, prediction/forecasting system, etc.) of an autonomous vehicle (AV) and/or the like may combine estimated tracking information for a road actor (and/or object) with uncertain state measurements with a compliant prior to identify and/or forecast the state of the road actor based on an assumption that, unless information/evidence indicates otherwise, road actors follow rules of the road. A compliant prior is based on an assumption that a track identified, detected, perceived, and/or determined by the perception system represents an actor following the rules of the road, until there is evidence otherwise. The perception system may evaluate whether a compliant prior (or any prior not based on direct observations and/or sensor information) is appropriate based on a comparison of current behavior of the perception system. To generate an estimate of the state of a road actor, the perception system may use perceived data such as speed, heading, and/or object type.

For example, when operating along with an AV traveling along a highway, the perception system described herein may be unable to measure the speed of a first road actor. However, if the perception system perceives a second road actor directly ahead of the first road actor, the perception system may make a reasonable assumption that the first and second road actors are traveling at comparable speeds. The uncertain speed measurement for the first road actor may be combined with the prior (e.g., the assumption of comparable speed) to provide a state estimate for the first road actor. Once the confidence is built in the previously uncertain speed measurement for the first road actor, the perception system may use it as the primary source of information for the state estimate for the first road actor.

Conventional perception systems generate an estimate of the state of an uncertain road actor when tracking does not have a clear estimate of speed, heading, and/or object type by comparing an unknown heading with an unknown velocity to generate an estimate of a state of the uncertain. For example, for an unknown heading, conventional perception systems will assume an object to be stationary, or for an unknown velocity, conventional perception systems will assume a track speed of a mean value published in a tracks message, which is routinely a zero speed track. As described, conventional perception systems are unable to appropriately handle missing or highly uncertain information. In particular, the assumption made by conventional perception systems of a stationary forecast or a zero-speed track may cause unexpected AV maneuvers (e.g., halts, jukes, etc.). An assumption made by conventional perception systems that a track is stationary in the middle of traffic is not reasonable without additional observations by tracking. Accordingly, the system, apparatus, device, method, and/or computer program product embodiments, and/or combinations and sub-combinations thereof, for state identification for road actors with uncertain measurements based on compliant priors described herein provide advantages over conventional perception systems through an evaluation of multiple tracked observations in relation to prior assumptions. These and other technological advantages are described herein.

As used herein, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and/or the like. An "autonomous vehicle" (or "AV") is a vehicle having a processor, programming instructions, and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle, or that a human operator may primarily drive the vehicle and an autonomous system may monitor the operations of the vehicle and take control of vehicle operations to avoid collisions.

Notably, the methods and systems for state identification for road actors with uncertain measurements based on compliant priors are being described herein in the context of an autonomous vehicle. However, the methods and systems are not limited to autonomous vehicle applications. The methods and systems described herein may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner Vehicle 102a is also referred to herein as AV 102a. AV 102a can include, but is not limited to, a land vehicle (as shown in FIG. 1), an aircraft, a watercraft, and/or the like.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like), and/or a pedestrian 116. According to some aspects, as described further herein, the AV 102a (e.g., via on-board computing device 113, etc.) may identify, perceive, forecast, and/or determine a state for the objects 102b, 114, 116. According to some aspects, a state measurement for object 102b may be uncertain. For example, a state measurement for object 102b may be uncertain due to over-segmentation in tracking, false detection, occlusion, early detection, and/or geometrically featureless aspects of object 102b. The AV 102a (e.g., via on-board computing device 113, etc.) may evaluate uncertain measurements along with compliant prior information to identify a state of the object 102b.

As illustrated in FIG. 1, the AV 102a may include a sensor system 111, an on-board computing device 113, a communications interface 117, and a user interface 115. The AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
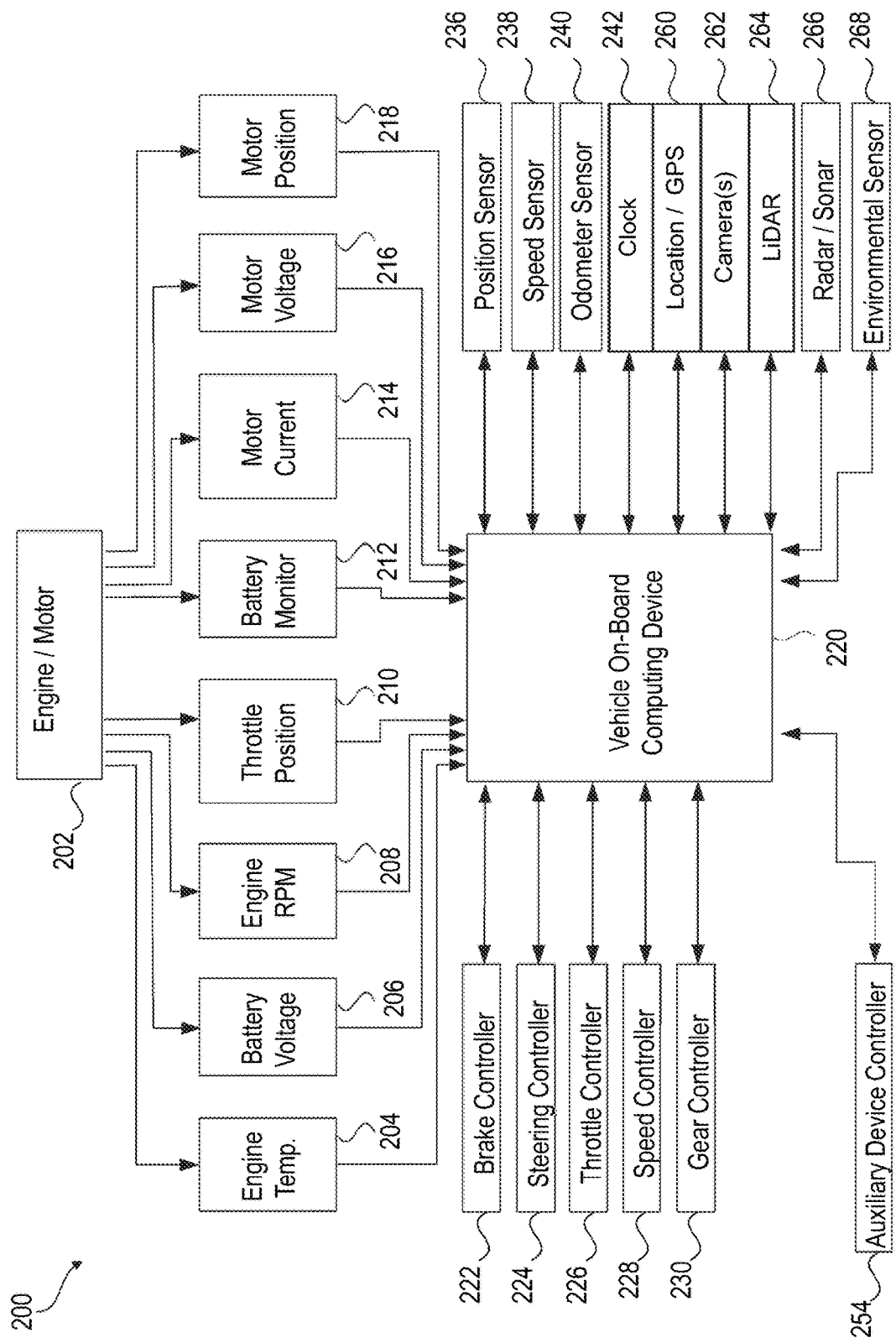
FIG. 2 shows an example architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

According to some aspects, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, an XG network, any other type of next-generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Although only a single database 112 is shown, the database 112 may include any number of databases, data repositories, data lakes, thirdparty data sources, and/or the like. Database 112 may be configured to store and supply raw data, indexed data, structured data, map data, program instructions, or other configurations as are known. For example, the database 112 may provide remote computing device 110 with ground truth data/information, such as JavaScript Object Notation (JSON) files and/or the like that contain labels (e.g. road actor classification information) for road actors (e.g., objects 102b, 114, 116, etc.), SE3 (e.g., proper rigid transformations in 3-dimensional Euclidean space) transformations to AV frame, velocity/speed information, bounding cuboids, and/or the like. The remote computing device 110 may provide the ground truth data/information to the AV 102a (e.g., to the on-board computing device 113 via the communication interface 117, etc.). The remote computing device 110 may provide the AV 102a with parameters such as max long acceleration/deceleration, maximum centripetal accelerations, and/or minimal turning radii for the AV 102a and/or road actors (e.g., objects 102b, 114, 116, etc.). The remote computing device 110 may provide the AV 102a map data/information including, but not limited to, vector maps (e.g., SQLite files, etc.) corresponding to ground truth data/information that may be used to extract information about a drivable area, lane segments that belong to a route traveled by the AV 102a, lane segments speed, and/or any other traffic and/or driving area related information.

According to some aspects, and as described in further detail later herein, the AV 102a may use kinematic prior estimates to accurately identify and/or forecast a state for a perceived actor with uncertain measurements such as the object 102b. According to some aspects, the AV 102a may use vector map information to apply vector map-based priors to the estimation process for actors with uncertain measurements, for example, to determine a likely lane for an object type. According to some aspects, the AV 102a may use any type of kinematic prior estimates to accurately identify and/or forecast a state for a perceived actor with uncertain measurements.

The communications interface 117 may be configured to allow communication between AV 102a and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infra-red link, Bluetooth, etc. The user interface 115 may be part of peripheral devices implemented within the AV 102a including, for example, a keyboard, a touch screen display device, a microphone, a speaker, etc.

FIG. 2 illustrates an example system architecture 200 for a vehicle, in accordance with aspects of the disclosure. Vehicles 102a and/or 102b of FIG. 1 can have the same or similar system architecture as shown in FIG. 2. Thus, the following discussion of system architecture 200 is sufficient for understanding vehicle(s) 102a, 102b of FIG. 1. However, other types of vehicles are considered within the scope of the technology described herein and may contain more or fewer elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors, and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is electric or hybrid, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope, and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 (e.g., the on-board computing device 113 of FIG. 1, etc.) may be implemented using the computer system 600 of FIG. 6. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

According to some aspects, the on-board computing device 220 may receive information from multiple sensors that are used to determine and/or provide pose related information, such as an inertial measurement unit (IMU) (not shown), the speed sensor 238, the location sensor 260, and the on-board computing device 220 may fuse (e.g., via one or more algorithms, etc.) the information from the multiple sensors and compare the fused information with lidar information high-definition map information.

Lidar information is communicated from lidar system 264 (e.g., the sensor system 111 of FIG. 1, etc.) to the on-board computing device 220. Additionally, captured images are communicated from the camera(s) 262 (e.g., the sensor system 111 of FIG. 1, etc.) to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store (e.g., the database 112 of FIG. 1, a local storage of the on-board computing device 220, etc.) to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost functions during the route, and may further access the traffic information and/or estimates that can affect an amount of time it will take to travel on a particular route. According to some aspects, the routing controller 231 can determine routes that avoid certain areas, such as keep out zones (KOZ), and/or the like. According to some aspects, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user (e.g., via the user interface 115 of FIG. 1, etc.) from among various possible routes.

According to some aspects, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or radar data, camera images, etc.) in order to identify objects and/or features in the environment of AV 102a. The objects may include traffic signals, roadway boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

According to some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

According to some aspects, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

According to some aspects, the on-board computing device 220 may receive predictions and decide how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds a threshold, it may determine whether the collision can be avoided if the autonomous vehicle follows a defined vehicle trajectory and/or implements one or more dynamically generated maneuvers performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change a direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Returning to FIG. 1, as described in FIG. 2, the on-board computing device 113 (e.g., the on-board computing device 220 of FIG. 2) may determine perception information of the surrounding environment of the AV 102a. For example, according to some aspects, the on-board computing device 113 may include a perception module 120. The sensor system 111 may provide the perception module 120 sensor and/or sensor-related data/information, and the on-board computing device 113 may provide the perception module 120 vehicle control and operation information. For example, the sensor system 111 may provide the perception module 120 with data logs, such as log slices, that describe all data collected by the sensor system 111 with predefined time intervals (e.g., 16-second intervals, etc.). The on-board computing device 113 may provide the perception module 120 with data logs, such as log slices, that describe all data collected by on-board computing device 113 with predefined time intervals (e.g., 16-second intervals, etc.). For example, data logs may include data/information such as route response messages, route progress messages, sensor information (e.g., lidar information, etc.), autonomous vehicle pose information (e.g., orientation information, pose, etc.), and/or the like pertaining to the AV 102a and/or road actors (e.g., objects 102b, 114, 116, etc.). The perception module 120 may use data/information from components of the system 100, such as sensor and/or sensor-related data/information from the sensor system 111, vehicle control and operation information from the on-board computing device 113, and raw data, indexed data, structured data, map data, and/or program instructions from the database 112 to identify and/or determine objects (e.g., spatially relevant objects, etc.) affecting a trajectory of the AV 102a.

According to some aspects, as previously described, objects perceived by the perception module 120 may include uncertain measurements from the sensor system 111. For example, when tracking objects (e.g., the object 102b, etc.) sensed by the sensor system 111, the perception module 120 may make the best estimate of the state for all detected and segmented tracks. When an uncertain track for an object (e.g., the object 102b, etc.) is identified it may be due to over-segmentation in tracking, false detection, occlusion, early detection, and/or geometrically featureless aspects of the object. As used herein, an uncertain track may include a track with high covariance in velocity and/or heading. A track with a high covariance in velocity and/or heading indicates a track without a reliable estimate from tracking, for example, such as an immature track.

According to some aspects, over-segmentation may occur in situations/scenarios when a detected object is not a real actor and is instead a false detection on another existing tracked object. False detection may occur when a detected object is not a real actor and is instead the result of noise within the sensor system 111 and/or an ephemeral object (e.g., steam, etc.) is perceived. Occlusion may occur when the perception module 120 receives first cycle detection information from the sensor system 111 regarding an object (e.g., the object 102b, etc.) and perception module 120 has not yet converged on a state estimate (e.g., a speed estimate needs at least two cycles of Lidar detection, etc.). Early detection may occur when the perception module 120 receives information from certain detection pipelines of the sensor system 111, for example, such as radar and monocular cuboids, that provide higher uncertainty or lead to incomplete track estimates until multiple detection pipelines of the sensor system 111 provide relevant sensed data. Geometrically featureless aspects of an object may result when point cloud registration on certain objects, such as guard rails, jersey barriers, walls, and/or other classes are under-constrained and lead to degeneracy.

According to some aspects, when an object perceived by the perception module 120 is associated with uncertain measurements from the sensor system 111, the perception module 120 may use a compliant prior (kinematic prior) to estimate its state. Compliant priors may include and/or be determined from a vector map prior, social features, lane-based data mining, and/or the like.

For example, according to some aspects, the perception module 120 may use map data (e.g., vector map data, raster map data, mapping information, etc.) and/or the like to accurately forecast, estimate, and/or predict a state for a road actor with uncertain measurements. According to some aspects, map data may encode "rules of the road" that help provide definitions for compliant behavior. Map data priors rely on the AV 102a to identify a likely lane segment based on track position. Outside of an intersection, the perception module 120 can select/identify an occupied lane, and use the speed limit and lane direction as a velocity and heading prior. The perception module 120 may apply a similar and/or same process for all actors occupying a lane segment According to some aspects, an example scenario/situation when the perception module 120 may apply a compliant prior to an uncertain track includes when vehicles are approaching the AV 102a according to some defined traffic control. The perception module 120 may model a "prior of obeying traffic laws." Since modeling may occur before the perception module 120 identifies objects/actors as yielding or non-yielding, the perception module 120 may assume that objects/actors with uncertain velocity will obey traffic control devices and/or rules (e.g., stop signs, traffic lights, etc.). The perception module 120 may evaluate properties and/or values that represent a distance to a stop sign, a distance to a traffic light, and/or the like. The perception module 120 may adjust kinematic state estimates such that a stop is achievable for the object/actor given some assumed acceleration. According to some aspects, the perception module 120 may use an observed velocity distribution combined with a posterior probability in forecasting to determine yielding or non-yielding probabilities.

According to some aspects, the perception module 120 may apply a compliant prior to an uncertain track based on perceived social features associated with the uncertain track. Social features may include, but are not limited to, behavior based on either the observed behavior of nearby actors, or the observed behavior of actors previously occupying similar locations. Social features may be used to inform the state of nearby tracks. In an embodiment, Algorithm 1 below may be used for applying a compliant prior to an uncertain track based on perceived social features. According to some aspects, Algorithm 1 may be used to build a prior for any uncertain track with nearby actors. Algorithm 1 is provided as an example. The system, apparatus, device, method, and/or computer program product embodiments, and/or combinations and sub-combinations thereof for state identification for road actors with uncertain measurements based on compliant priors are not limited to Algorithm 1 and other algorithms may be used in accordance with the embodiments herein.

---
Algorithm 1
---
Algorithm: social feature estimation
Steps:
   1. Identify a substantially occupied lane
   2. Identify nearby actors (within some radius)
      using social features R-tree
   3. Select actors which are nearby according to the
      lane graph(e.g., a predecessor to a certain distance,
      a successor to a certain distance, the same direction
      neighbor, a predecessor/successor of a neighbor, etc.)
   4. Remove any actors which also have uncertain state
      estimates for the same value (if perception module
      120 does not have a good estimate of track
      velocity, the track velocity will not be used to
      influence a prior for other tracks)
   5. Remove actors which are in neighboring
      lanes, parked, and/or of different
      object types (otherwise, use all nearby actors in a scene)
   6. Do not remove lane-blocking vehicles. Particularly,
      parked vehicles do not typically influence the
      speed of actors participating in traffic, but lane
      blocking actors often can (e.g. if someone
      is stuck behind them, etc.)
   7. Take an average of the states of the identified actors.
      The average may be weighted by the covariance
      of velocity estimates and distance/relative position.
      Note, that other actors' states may be calculated in a previous
      inference cycle and thus may be slightly out of date. Due to the
      uncertainty of the prior itself, this is assumed to not be an issue
   8. Build prior for any uncertain track with nearby actors
---

Figure 3:
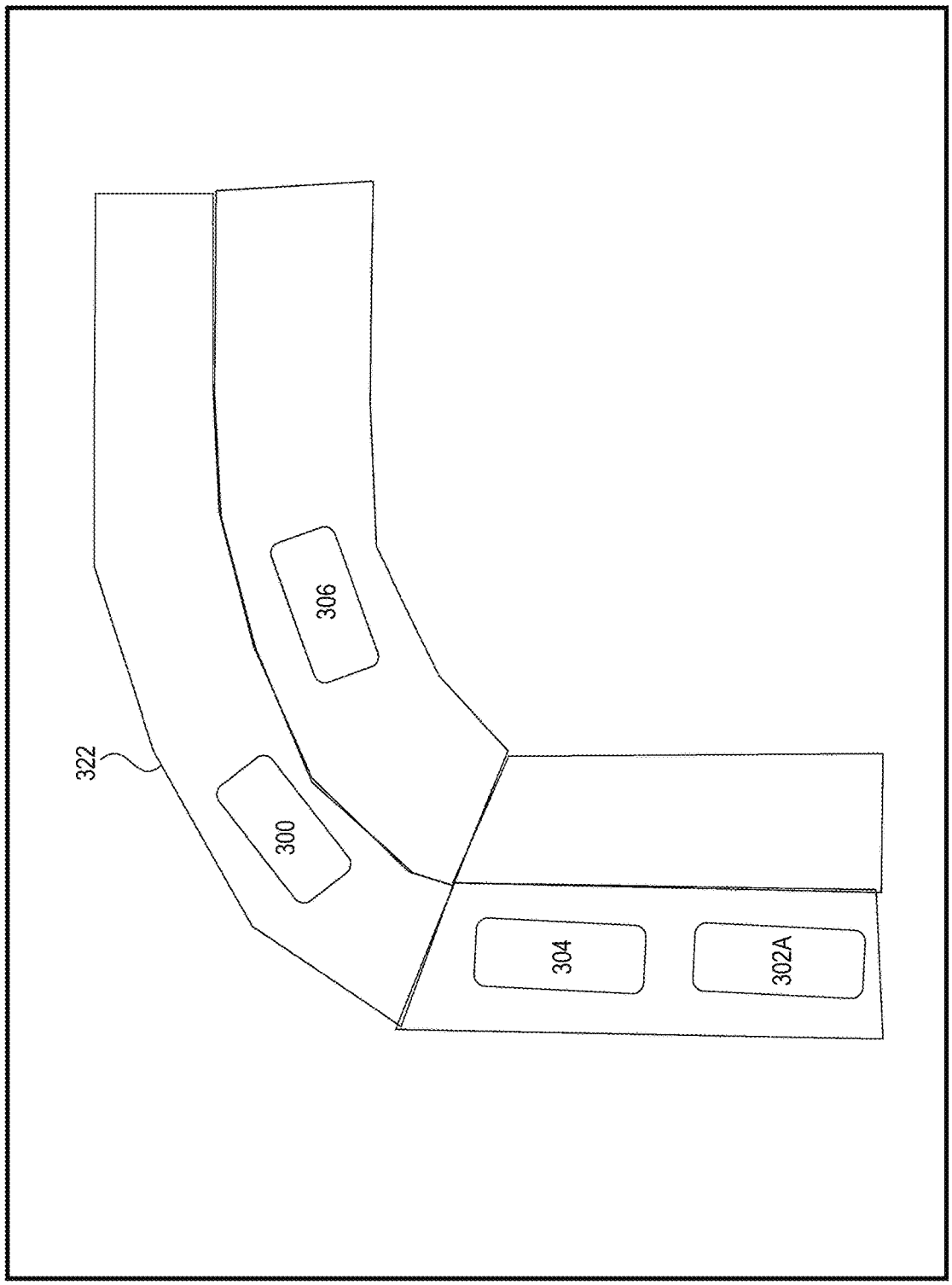
FIG. 3 shows an example an example application of steps used for state identification for road actors with uncertain measurements based on compliant priors, in accordance with aspects of the disclosure.

FIG. 3 is an example application of Algorithm 1. Track 300 has an uncertain observed velocity. Applying Algorithm 1, a perception module 320 (e.g., the perception module 120 of FIG. 1, etc.) may determine a prior from the velocity of tracks 304 and 306 as they travel along roadway 322. The perception module 320 may assume that Track 300 has a similar velocity distribution as tracks 304 and 306. According to some aspects, as previously described, a state estimate of velocity for Track 300 may also further be evaluated based on a velocity prior (assumed compliant) determined from map data, such as a vector map and/or the like describing the rules of the road for the roadway 322. The rules of the road for roadway 322 may include a speed limit for roadway 322. The perception module 320 may assume that Track 300 is adhering to the speed limit for roadway 322. Distributions of velocity values may be determined from uncertain observed velocity measurements, social velocity priors (e.g., tracks 304 and 305), and a map vector prior (e.g., the speed limit for roadway 322, etc.). An accurate estimation of velocity for Track 300 may be identified based on an evaluation of the uncertain observed velocity measurements, social velocity priors (e.g., tracks 304 and 305), and the map vector prior.

Returning to FIG. 1, according to some aspects, the perception module 120 may apply a lane-based prior to an uncertain track based on data mining. For example, according to some aspects, the AV 102a may include a storage module (e.g., local storage, remote storage, the database 112, etc.). The storage module may store a per-lane map of likely speeds for different object types, times of day, and/or the like. The perception module 120 may use data mining (offboard) to source kinematic prior estimates. According to some aspects, the perception module 120 may weigh and/or evaluate sources of kinematic prior estimates for relevancy when generating a posterior inference. For example, although lane-based data mining may be used, it should not take precedence over (and should be weighted less than) a social velocity prior (e.g., evaluated from nearby actors, etc.), because the primary determinant of a reasonable speed is the speed of the lead actor. In a situation/scenario when no nearby actors exist, then lane-based data mining may be weighed more heavily.

According to some aspects, the perception module 120 may identify and/or evaluate uncertainty in prior estimates. The perception module 120 may control a prior's influence on a posterior distribution by adjusting the covariance of the prior. If an observed track is certain, for example, such as a track observed for lots of cycles with significant sensor data received from the sensor system 111, the perception module 120 will permit the certain observation to dominate a posterior estimate. If an observed track is highly uncertain (e.g., to a degree that it should be ignored, etc.), the observed velocity may be ignored and/or weighed less, enabling compliant priors to dominate a posterior estimate. Accordingly, the perception module 120 may dynamically adjust the confidence of a prior.

According to some aspects, value distributions, for example, such as distributions of velocity values, generated from priors and/or observed data (e.g., sensed data from the sensor system 111, etc.) may be bivariate Gaussian distributions. The perception module 120 may combine calculated distributions by implementing filtering. For example, the perception module 120 may implement a Kalman filter update with an identity transform for the measurement model (measurement and state space are the same). The perception module 120 may fuse information from both prior and observation according to their uncertainty. In the case of multiple priors (e.g. social and map priors), resultant distributions may be applied sequentially to the observation (e.g., via a multi-sensor fusion Kalman filter, etc.) as the order of the updates does not change the outcome.

According to some aspects, in situations/scenarios when the perception module 120 is unable to identify a sensible compliant prior, the prior will be considered uniform. Therefore there is equivalence whether the perception module 120 applies the uniform prior or simply skips an update step. For example, in situations/scenarios when an occupied lane is unclear (like in an intersection) or there is no surrounding traffic to queue off of, the perception module 120 may apply a uniform prior or simply skip an update step.

According to some aspects, the perception module 120 may apply any prior to observed data to output a state forecast for a road actor and/or object with uncertain measurements. For example, according to some aspects, a prior may be associated with an object type. For simplicity, velocity priors have been described herein. However, joint inference based on object type distribution and velocity distribution is also considered.

According to some aspects, the perception module 120 may output and evaluate metrics resulting from applied priors in comparison to the use of only observed data for when identifying the state of actors/objects. The perception module 120 may analyze system-level data, for example, stored in the storage module 122, captured by a ride quality dashboard, and/or the like, to ensure that the methods implemented for state identification for road actors with uncertain measurements based on compliant priors results in a reduction in unexpected maneuvers (e.g., halts, jukes, etc.) by the AV 102*a* without regression in mover margins.

According to some aspects, the system, apparatus, device, method, and/or computer program product embodiments, and/or combinations and sub-combinations thereof, for state identification for road actors with uncertain measurements based on compliant priors described herein may be used in forecasting to predict compliant yielding and/or non-yielding behavior. As described, the use of a map-based velocity prior considers traffic control signals with the same logic as a route following policy implemented by the AV 102*a*. A result may include forecasting being biased towards generating branches for compliant behavior. If generating branches for compliant behavior is not sufficient, the perception module 120 may use a high observed velocity uncertainty of an object (e.g., AV 102*b*, etc.) as a signal to favor the compliant branch. In an embodiment, Algorithm 2 below may be used if an expansion and likelihood determination of a non-compliant branch is necessary. Algorithm 2 is provided as an example. The system, apparatus, device, method, and/or computer program product embodiments, and/or combinations and sub-combinations thereof for state identification for road actors with uncertain measurements based on compliant priors are not limited to Algorithm 2 and other algorithms may be used in accordance with the embodiments herein.

| Algorithm 2 |
|---|
| Algorithm: expansion and likelihood determination of a non-compliant branch Steps:<br>1. Determine the maximum velocity at which it is possible to brake before a stop line, assuming max deceleration for an object type<br>2. Calculate the probability of the posterior velocity distribution above the maximum velocity determined in step 1. Note: this assumes a vehicle will always brake if able to (i.e. a "best case" assumption) |

Figure 4:
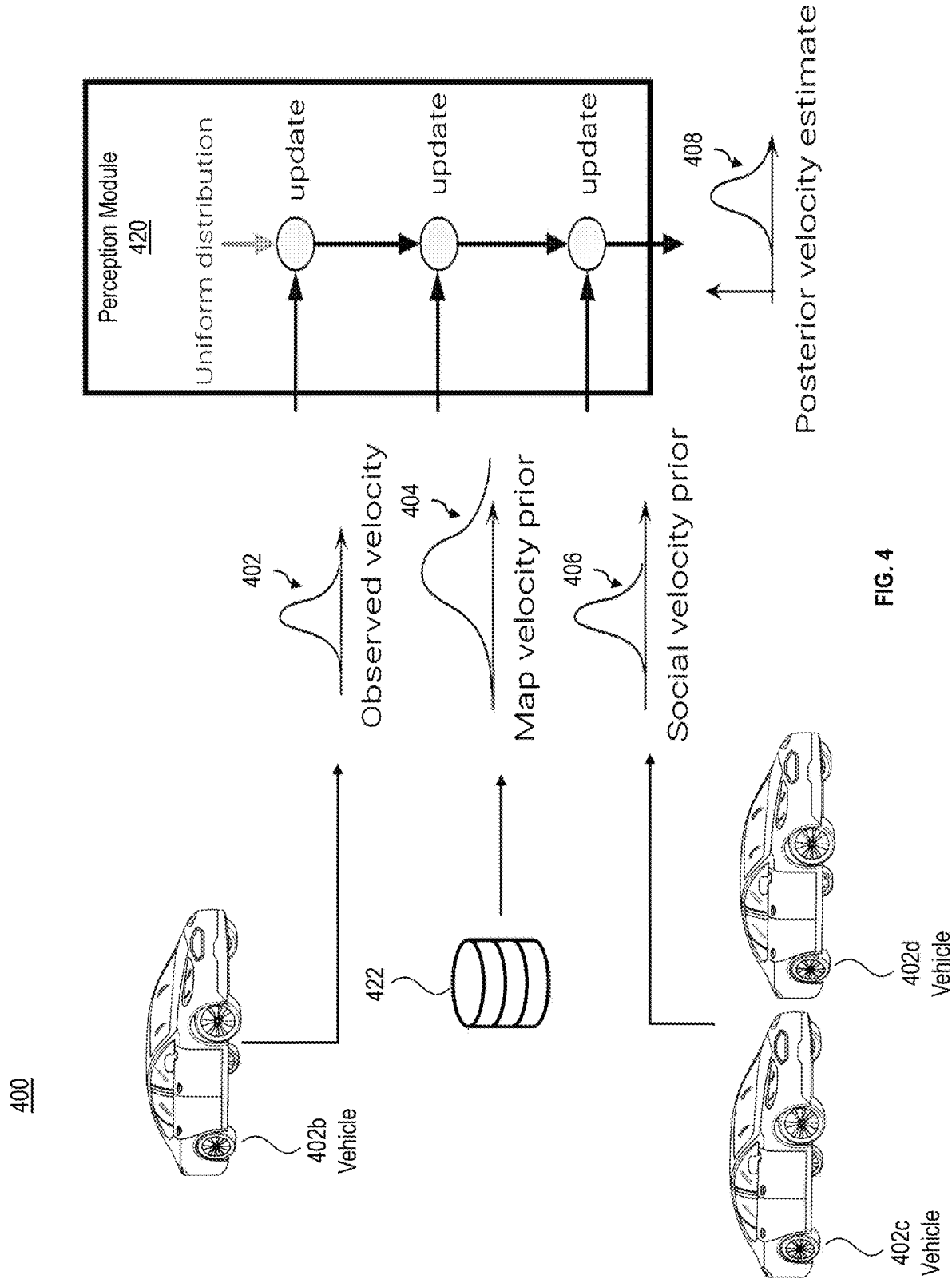
FIG. 4 shows an example block diagram of logic implemented by a perception module to identify a state for a road actor with uncertain measurements based on compliant priors, in accordance with aspects of the disclosure.

FIG. 4 shows an example block diagram of a system 400 (e.g., the system 100 of FIG. 1, etc.) depicting logic implemented by a perception module 420 (e.g., the perception module 120 of FIG. 1, etc.) when identifying a state for road actors with uncertain measurements based on compliant priors. The perception module 420 receives sensor data (information) from a sensor system (e.g., the sensor system 111 of FIG. 1, etc.) indicative of the detection of a vehicle 402*b* (e.g., AV 102*b* of FIG. 1, etc.). Although FIG. 4 illustrates the detected object as being vehicle 402*b*, it should be understood by those of ordinary skill in the arts that other road actors may similarly be detected and analyzed. The sensor data may provide uncertain measurements of velocity (or any other kinematic state) for the AV 402*b*, for example, based on at least one of: oversegmentation associated with the sensor data, false information associated with the sensor data, occlusion of the AV 402*b*, an amount of geometric features of the AV 402*b*, and/or the like. Responsive to the uncertain measurements of velocity, the perception module may generate a distribution of observed velocity values 402 and also apply kinematic priors (compliant priors) to the observed velocity values 402.

A state estimate of velocity for the AV 402*b* may further be evaluated based on a map velocity prior (assumed compliant) determined from map data 422. The map data 422 may describe the rules of a road (e.g., speed limit, etc.) traveled by the AV 402*b*. The perception module 420 may assume that AV 402*b* is adhering to the speed limit indicated by the map data 422. The perception module may generate a distribution of map velocity values 404 (for a time interval) based on the assumption that the AV 402*b* will travel within the speed limit. According to some aspects, map data 422 may be a different type of map data. For example, a state estimate of velocity for the AV 402*b* may further be evaluated based on a map velocity prior (assumed compliant) determined from any type of map data.

A state estimate of velocity for the AV 402*b* may further be evaluated based on a social velocity prior (assumed compliant) determined from the calculated velocities of AV 402*c* and AV 402*d*. AV 402*c* and AV 402*d* may be operating in proximity to the AV 402*a* ad may be associated with accurately calculated and/or validated velocity values (e.g., based on a multitude of sensor data from multiple sensors of a sensor system such as the sensor system 111 of FIG. 1, etc.). The perception module 420 may assume that AV 402*b* is adhering to similar speeds and/or velocities as AV 402*c* and AV 402*d*. The perception module may generate a distribution of social velocity values 406 (for a time interval) based on the assumption that the AV 402*b* will travel at a comparable velocity as AV 402*c* and AV 402*d*.

The velocity distributions 402, 404, and 406 may be compared and/or evaluated using a statistical inference model, for example, such as Bayesian inference and/or the like. The perception module may output a posterior velocity estimate 408 for the AV 402*b*. According to some aspects, the posterior velocity estimate 408 may be used to cause the AV 402*a* to execute a driving maneuver. For example, based on the posterior velocity estimate 408, the AV 402*a* may execute a driving maneuver to avoid the AV 402*b*, bypass the AV 402*b*, follow the AV 402*b*, and/or any other driving maneuver.

Figure 5:
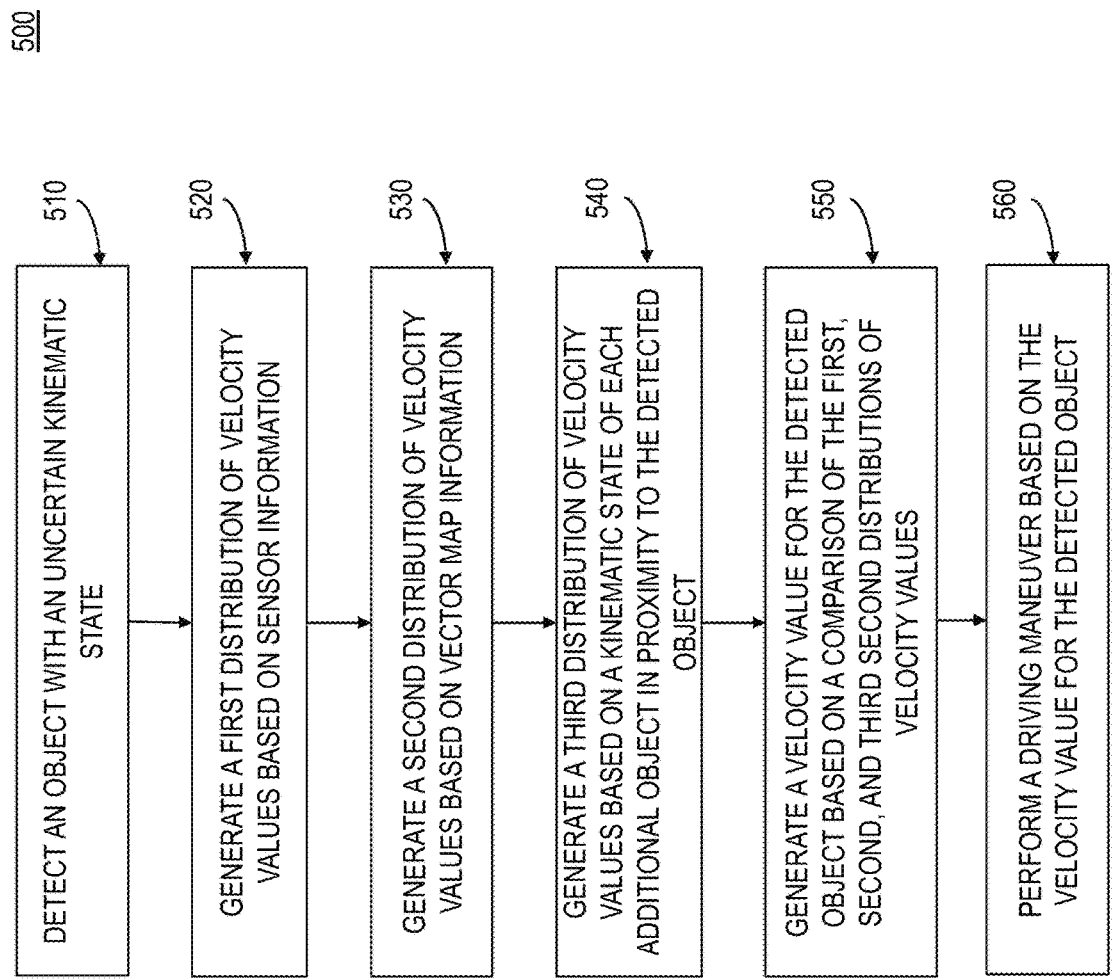
FIG. 5 shows a flowchart of an example method for state identification for road actors with uncertain measurements based on compliant priors, in accordance with aspects of the disclosure.

FIG. 5 shows a flowchart of an example method 500 for state identification for road actors with uncertain measurements based on compliant priors, according to some aspects. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1-4. However, method 500 is not limited to the aspects of those figures. The on-board computing device 113 (e.g., the perception module 120, etc.) may facilitate state identification for road actors with uncertain measurements based on compliant priors.

In 510, on-board computing device 113 detects an object with an uncertain kinematic state. For example, the on-board computing device 113 may detect the object with the uncertain kinematic state based on sensor information received from a sensing device associated with a vehicle. The uncertain kinematic state may be, for example, based on at least one of: oversegmentation associated with the sensor information, false information associated with the sensor information, occlusion of the detected object, or an amount of geometric features of the detected object.

In 520, on-board computing device 113 generates a first distribution of velocity values. For example, the on-board computing device 113 may generate the first distribution of velocity values based on the sensor information. Generating the first distribution of velocity values may include, in response to the uncertain kinematic state of the detected object, the on-board computing device 113 extracting from the sensor information, an indication of position for the detected object, and an indication of velocity for the detected object. The on-board computing device 113 may generate a trajectory for the detected object based on the indicated position and the indicated velocity. The on-board computing device 113 may identify the first distribution of velocity values from the trajectory for the object.

In 530, on-board computing device 113 generates a second distribution of velocity values. For example, the on-board computing device 113 may generate the second distribution of velocity values based on map information. The map information may indicate at least one of a speed limit for a route (and/or a lane, a path, etc.) or an instruction for the route. Generating the second distribution of velocity values may include identifying that the detected object is located on the route. The on-board computing device 113 may generate the second distribution of velocity values based on an assumption that the detected object will move along the route during a time window and at least one of the speed limit for the route or the instruction for the route.

In 540, on-board computing device 113 generates a third distribution of velocity values. For example, the on-board computing device 113 may generate the third distribution of velocity values based on a kinematic state for each additional object of a plurality of additional objects in proximity to the detected object. The proximity to the detected object may include at least one of spatial proximity or temporal proximity Generating the third distribution of velocity values may include detecting the plurality of additional objects based on the sensor information. The on-board computing device 113 may remove any additional object with a respective uncertain kinematic state from the plurality of additional objects. The on-board computing device 113 may remove from remaining additional objects of the plurality of additional objects any objects that comprise at least one of a stationary state or an object type that is different from an object type of the object. The on-board computing device 113 may generate the third distribution of velocity values based on a respective velocity indicted for each additional object of the remaining additional objects.

In 550, on-board computing device 113 generates a velocity value for the detected object with the unknown kinematic state. For example, the on-board computing device 113 may generate the velocity value for the detected object with the unknown kinematic state based on a comparison of the first distribution of velocity values, the second distribution of velocity values, and the third distribution of velocity values. For example, the comparison of the first distribution of velocity values, the second distribution of velocity values, and the third distribution of velocity values may include evaluating an amount of statistical uncertainty associated with each of the first distribution of velocity values, the second distribution of velocity values, and the third distribution of velocity values. For example, according to some aspects comparing the first distribution of velocity values, the second distribution of velocity values, and the third distribution of velocity values may be performed based on a statistical inference such as Bayesian inference and/or the like.

Figure 6:
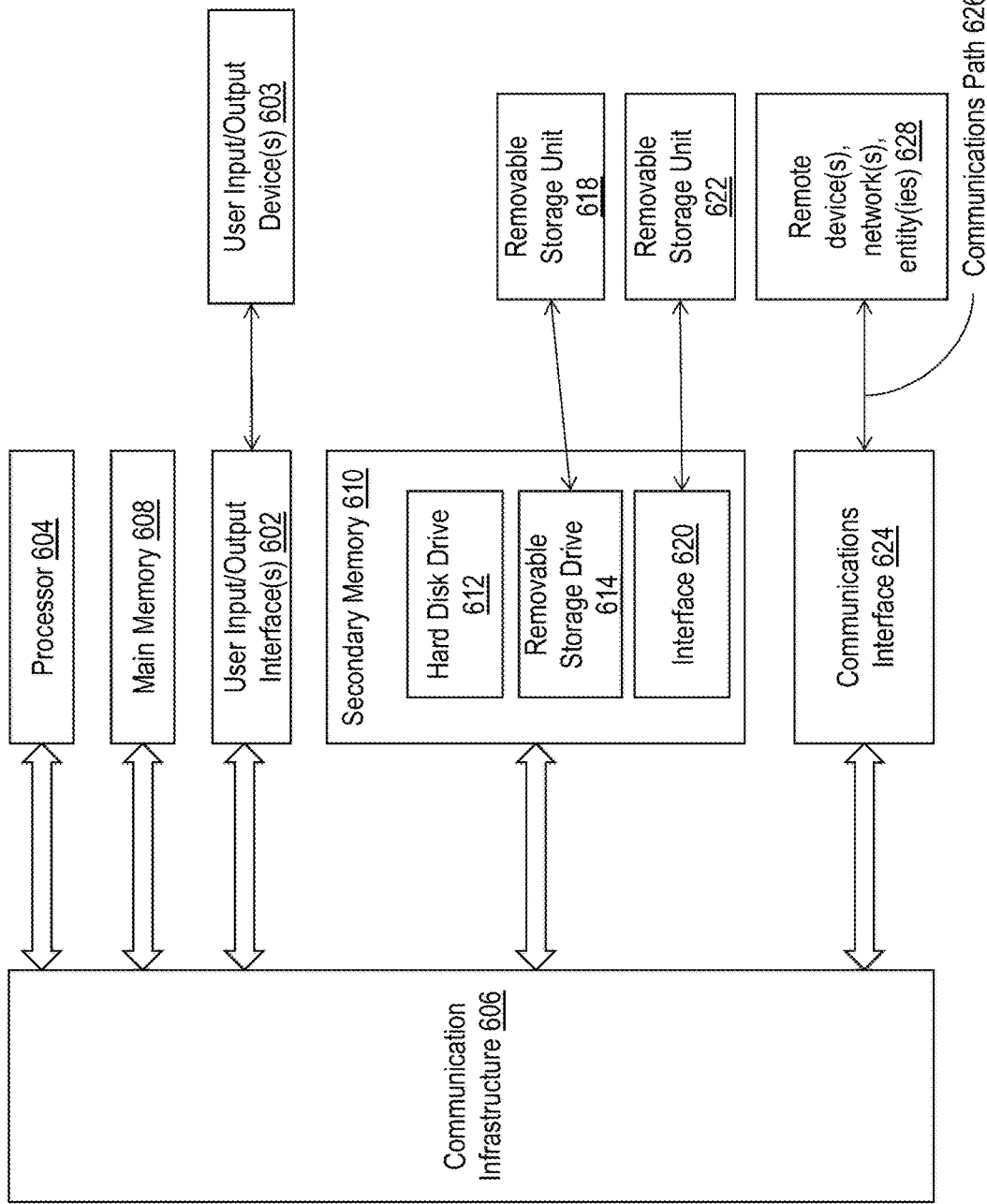
FIG. 6 is an example computer system useful for implementing various aspects of the disclosure.

Various embodiments can be implemented, for example, using one or more computer systems, such as computer system 600 shown in FIG. 6. Computer system 600 can be any computer capable of performing the functions described herein.

Computer system 600 can be any well-known computer capable of performing the functions described herein. According to some aspects, the on-board computing device 113 of FIG. 1 (and/or any other device/component described herein) may be implemented using the computer system 600. According to some aspects, the computer system 600 may be used and/or specifically configured to implement method 500.

Computer system 600 includes one or more processors (also called central processing units, or CPUs), such as a processor 604. Processor 604 is connected to a communication infrastructure (and/or bus) 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, a tape backup device, and/or any other storage device/drive.

Removable storage drive 614 may interact with a removable storage unit 618. Removable storage unit 618 includes a computer-usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method performed by a processor comprising:
   detecting, based on sensor information received from a sensing device associated with a vehicle, an object with an uncertain kinematic state, wherein the uncertain kinematic state of the detected object is based on at least one of: oversegmentation associated with the sensor information, false information associated with the sensor information, occlusion of the detected object, or an amount of geometric features of the detected object;
   generating, based on the sensor information, a first distribution of velocity values;
   generating, based on map information, a second distribution of velocity values;
   generating, based on a kinematic state for each additional object of a plurality of additional objects in proximity to the detected object, a third distribution of velocity values;
   generating a velocity value for the object, the velocity value being based on a comparison of the first distribution of velocity values, the second distribution of velocity values, and the third distribution of velocity values; and
   performing, based on the velocity value for the detected object, a driving maneuver.

2. The method of claim 1, wherein the generating the first distribution of velocity values comprises:
   in response to the uncertain kinematic state of the detected object, extracting from the sensor information, an indication of position for the detected object and an indication of velocity for the detected object;
   generating, based on the indicated position and the indicated velocity, a trajectory for the detected object; and
   identifying, from the trajectory for the detected object, the first distribution of velocity values.

3. The method of claim 1, wherein the map information indicates at least one of a speed limit for a route or an instruction for the route, wherein the generating the second distribution of velocity values comprises:
   identifying that the detected object is located on the route; and
   generating, based on an assumption that the detected object will move along the route during a time window and at least one of the speed limit for the route or the instruction for the route, the second distribution of velocity values.

4. The method of claim 1, wherein the generating the third distribution of velocity values comprises:
   detecting, based on the sensor information, the plurality of additional objects;
   removing, from the plurality of additional objects, any additional object with a respective uncertain kinematic state;
   removing, from remaining additional objects of the plurality of additional objects, any objects that comprise at least one of a stationary state or an object type that is different from an object type of the object; and generating, based on a respective velocity indicated for each additional object of the remaining additional objects, the third distribution of velocity values.

5. The method of claim 1, wherein the proximity to the detected object comprises at least one of a spatial proximity or a temporal proximity.

6. The method of claim 1, wherein the comparison of the first distribution of velocity values, the second distribution of velocity values, and the third distribution of velocity values comprises evaluating an amount of statistical uncertainty associated with each of the first distribution of velocity values, the second distribution of velocity values, and the third distribution of velocity values.

7. A computing system comprising:
a memory of a vehicle configured to store instructions;
a processor of the vehicle, coupled to the memory, configured to process the stored instructions to:
detect, based on sensor information received from a sensing device associated with the vehicle, an object with an uncertain kinematic state, wherein the uncertain kinematic state of the detected object is based on at least one of: oversegmentation associated with the sensor information, false information associated with the sensor information, occlusion of the detected object, or an amount of geometric features of the detected object;
generate, based on the sensor information, a first distribution of velocity values;
generate, based on map information, a second distribution of velocity values;
generate, based on a kinematic state for each additional object of a plurality of additional objects in proximity to the detected object, a third distribution of velocity values;
generate a velocity value for the object, the velocity value being based on a comparison of the first distribution of velocity values, the second distribution of velocity values, and the third distribution of velocity values; and
perform, based on the velocity value for the detected object, a driving maneuver.

8. The system of claim 7, wherein the processor configured to generate the first distribution of velocity values is further configured to:
in response to the uncertain kinematic state of the detected object, extract from the sensor information, an indication of position for the detected object and an indication of velocity for the detected object;
generate, based on the indicated position and the indicated velocity, a trajectory for the detected object; and
identify, from the trajectory for the detected object, the first distribution of velocity values.

9. The system of claim 7, wherein the map information indicates at least one of a speed limit for a route or an instruction for the route, wherein the processor configured to generate the second distribution of velocity values is further configured to:
identify that the detected object is located on the route; and
generate, based on an assumption that the detected object will move along the route during a time window and at least one of the speed limit for the route or the instruction for the route, the second distribution of velocity values.

10. The system of claim 7, wherein the processor configured to generate the third distribution of velocity values is further configured to:

detect, based on the sensor information, the plurality of additional objects;
remove, from the plurality of additional objects, any additional object with a respective uncertain kinematic state;
remove, from remaining additional objects of the plurality of additional objects, any objects that comprise at least one of a stationary state or an object type that is different from an object type of the object; and
generate, based on a respective velocity indicated for each additional object of the remaining additional objects, the third distribution of velocity values.

11. The system of claim 7, wherein the proximity to the detected object comprises at least one of a spatial proximity or a temporal proximity.

12. The system of claim 7, wherein the processor configured to compare the first distribution of velocity values, the second distribution of velocity values, and the third distribution of velocity values is further configured to evaluate an amount of statistical uncertainty associated with each of the first distribution of velocity values, the second distribution of velocity values, and the third distribution of velocity values.

13. A non-transitory computer-readable medium having instructions stored thereon that, when executed by at least one computing device, cause the at least one computing device to perform operations comprising:
detecting, based on sensor information received from a sensing device associated with a vehicle, an object with an uncertain kinematic state, wherein the uncertain kinematic state of the detected object is based on at least one of: oversegmentation associated with the sensor information, false information associated with the sensor information, occlusion of the detected object, or an amount of geometric features of the detected object;
generating, based on the sensor information, a first distribution of velocity values;
generating, based on map information, a second distribution of velocity values;
generate, based on a kinematic state for each additional object of a plurality of additional objects in proximity to the detected object, a third distribution of velocity values;
generate a velocity value for the object, the velocity value being based on a comparison of the first distribution of velocity values, the second distribution of velocity values, and the third distribution of velocity values; and
performing, based on the velocity value for the detected object, a driving maneuver.

14. The non-transitory computer-readable medium of claim 13, wherein the generating the first distribution of velocity values comprises:
in response to the uncertain kinematic state of the detected object, extracting from the sensor information, an indication of position for the detected object and an indication of velocity for the detected object;
generating, based on the indicated position and the indicated velocity, a trajectory for the detected object; and
identifying, from the trajectory for the detected object, the first distribution of velocity values.

15. The non-transitory computer-readable medium of claim 13, wherein the map information indicates at least one of a speed limit for a route or an instruction for the route, wherein the generating the second distribution of velocity values comprises:

identifying that the detected object is located on the route; and generating, based on an assumption that the detected object will move along the route during a time window and at least one of the speed limit for the route or the instruction for the route, the second distribution of velocity values.

16. The non-transitory computer-readable medium of claim 13, wherein the generating the third distribution of velocity values comprises:

detecting, based on the sensor information, the plurality of additional objects;

removing, from the plurality of additional objects, any additional object with a respective uncertain kinematic state;

removing, from remaining additional objects of the plurality of additional objects, any objects that comprise at least one of a stationary state or an object type that is different from an object type of the object; and generating, based on a respective velocity indicated for each additional object of the remaining additional objects, the third distribution of velocity values.

17. The non-transitory computer-readable medium of claim 13, wherein the proximity to the detected object comprises at least one of a spatial proximity or a temporal proximity.

18. The non-transitory computer-readable medium of claim 13, wherein the comparison of the first distribution of velocity values, the second distribution of velocity values, and the third distribution of velocity values comprises evaluating an amount of statistical uncertainty associated with each of the first distribution of velocity values, the second distribution of velocity values, and the third distribution of velocity values.

\* \* \* \* \*